(12) United States Patent
Schiestl et al.

(10) Patent No.: US 8,136,513 B2
(45) Date of Patent: Mar. 20, 2012

(54) INTERNAL COMBUSTION ENGINE

(75) Inventors: Stefan Schiestl, Wiesing (AT); Thomas Weitzer, Innsbruck (AT)

(73) Assignee: GE Jenbacher GmbH & Co OHG, Jenbach (AT)

( * ) Notice: Subject to any disclaimer, the term of this patent is extended or adjusted under 35 U.S.C. 154(b) by 0 days.

(21) Appl. No.: 13/041,605

(22) Filed: Mar. 7, 2011

(65) Prior Publication Data

US 2011/0155112 A1    Jun. 30, 2011

Related U.S. Application Data

(63) Continuation of application No. PCT/AT2009/000361, filed on Sep. 18, 2009.

(30) Foreign Application Priority Data

Sep. 26, 2008   (AT) ................. A 1499/2008

(51) Int. Cl.
*F02D 41/00* (2006.01)
*F02M 7/087* (2006.01)
*F02M 21/02* (2006.01)
*F02B 33/02* (2006.01)

(52) U.S. Cl. ............ 123/672; 123/559.1; 123/525; 123/435

(58) Field of Classification Search .......... 123/672, 123/27 GE, 525, 559.1, 563, 564, 526, 527, 123/435, 436; 60/605.1
See application file for complete search history.

(56) References Cited

U.S. PATENT DOCUMENTS

| 2,935,978 | A | 5/1960 | Kelgard et al. |
| 6,779,344 | B2 * | 8/2004 | Hartman et al. ............... 60/600 |
| 2003/0114978 | A1 | 6/2003 | Rimnac et al. |
| 2004/0244782 | A1 | 12/2004 | Lewallen |
| 2009/0050117 | A1 | 2/2009 | Tai et al. |

FOREIGN PATENT DOCUMENTS

| DE | 41 09 320 | 9/1992 |
| DE | 197 27 597 | 8/1998 |
| DE | 10 2007 041 228 | 4/2008 |
| EP | 0 259 382 | 3/1988 |
| EP | 1 205 659 | * 10/2001 |
| JP | 2-95729 | 4/1990 |
| JP | 2006-177331 | 7/2006 |
| WO | 2007/097750 | 8/2007 |

OTHER PUBLICATIONS

International Search Report issued Feb. 3, 2010 in International (PCT) Application No. PCT/AT2009/000361.
Austrian Patent Office issued Jul. 30, 2009 in Austrian Patent Application No. A 1499/2008.

* cited by examiner

*Primary Examiner* — Hai Huynh
(74) *Attorney, Agent, or Firm* — Wenderoth, Lind & Ponack, L.L.P.

(57) ABSTRACT

The invention relates to a method for operating an internal combustion engine, wherein air is inducted and then compressed. Before introduction into a combustion chamber of the internal combustion engine, the air humidity of the inducted air is determined and temperature of the compressed air introduced into the combustion chamber is altered depending on the air humidity of the inducted air.

20 Claims, 1 Drawing Sheet

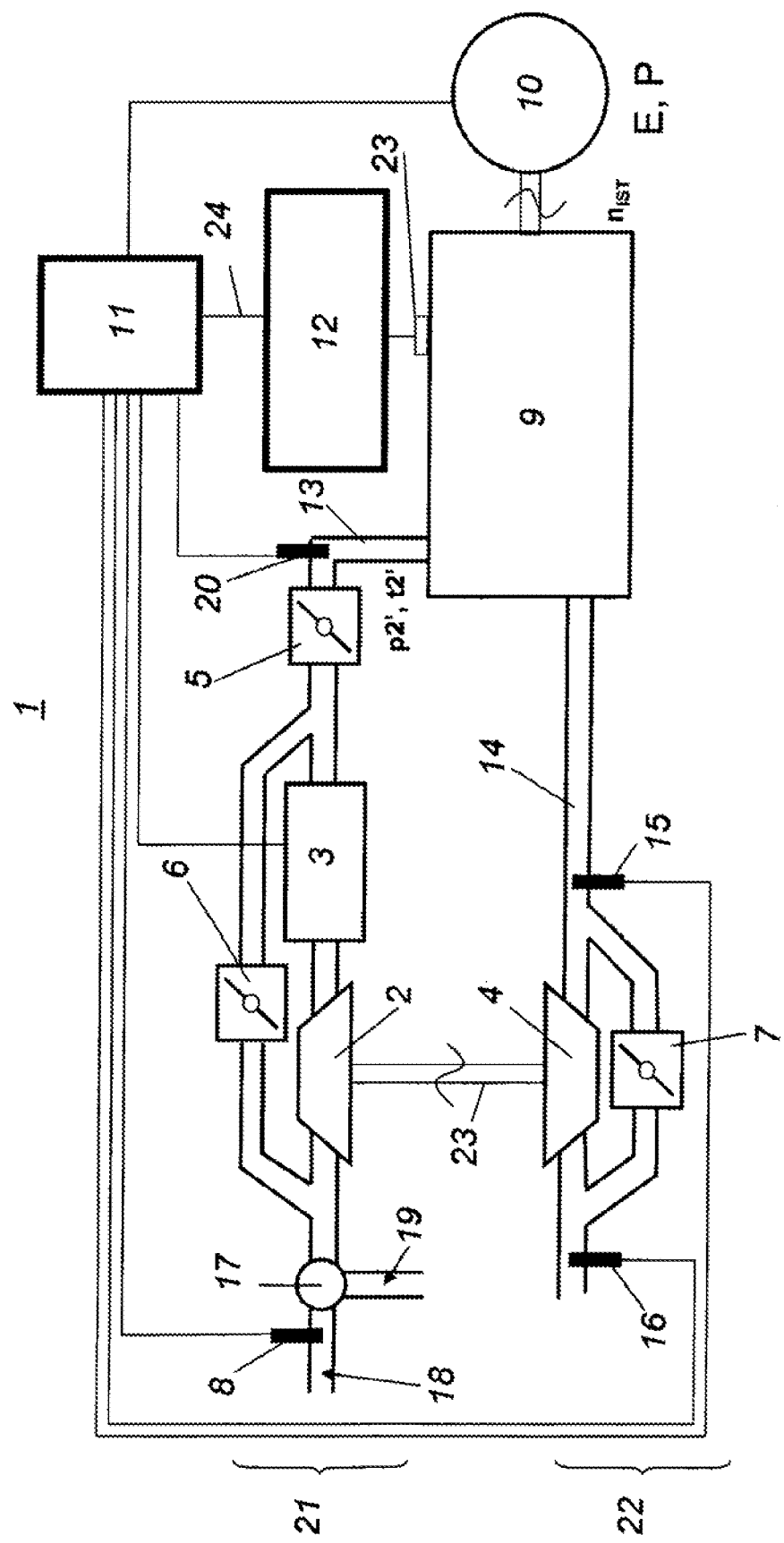

INTERNAL COMBUSTION ENGINE

This application is a Continuation of International application No. PCT/AT2009/000361, filed Sep. 18, 2009, the entire disclosure of which is incorporated herein by reference.

BACKGROUND OF THE INVENTION

The present invention concerns a method of operating an internal combustion engine wherein air is inducted and then compressed before it is fed to at least one combustion chamber of the internal combustion engine. The invention further concerns an internal combustion engine including a compressor device for compressing gas, a device for altering the temperature of the compressed air, and a regulating device or control device which regulates the internal combustion engine to a substantially constant operating parameter. The invention further concerns regulating devices for the aforementioned method and the aforementioned internal combustion engine. Finally the invention concerns a stationary power generating installation including an internal combustion engine of the aforementioned kind and a generator.

Powerful internal combustion engines regularly have compressor devices with which the inducted air which is fed to the combustion chamber is compressed. In that case, the pressure of the inducted air is markedly increased.

The inducted air is compressed in the compressor device of the internal combustion engine, then under some circumstances cooled with a cooler and finally passed into the combustion chamber of the internal combustion engine. Condensation of water frequently occurs in the region of the inlet valves, with the result that mechanical components with which it comes into contact are damaged. In addition, the condensate causes ignition misfires, which as a further consequence can lead to engine shut-downs.

SUMMARY OF THE INVENTION

The object of the present invention is thus to provide a method of operating an internal combustion engine, with which the problems of water condensation are reduced. The invention further seeks to provide an internal combustion engine of the above-indicated general kind which is less susceptible to mechanical damage and ignition misfiring.

That object is attained by a method in which the air humidity of the inducted air is determined and the temperature of the compressed air fed to the combustion chamber is altered based on the air humidity of the inducted air. In the case of an internal combustion engine of the general kind set forth in the opening part of this specification, that object is attained in that there is provided a humidity sensor with which the air humidity of the air inducted by the internal combustion engine in the operating condition can be measured upstream of the compressor device. The control device or regulating device then controls or regulates the device for altering the temperature of the compressed air based on the air humidity.

Depending on the climatic conditions, the inducted air more specifically includes a higher or lower content of water in gas form. The so-called relative air humidity describes the percentage relationship between the instantaneous water vapor pressure and the saturation water vapor pressure over a clean flat surface of water. With a relative air humidity of 50 percent, the air contains half the amount of water vapor which could be contained at a maximum at a corresponding temperature. With 100 percent relative air humidity and the corresponding temperature the air is completely saturated with water vapor. The saturation vapor pressure of water is dependent on temperature and pressure changes, as is known from the Clausius-Clapeyron equation. By virtue of the new temperature and pressure conditions in respect of the inducted and now compressed air downstream of the compressor device and optionally the cooling device, the saturation water vapor pressure can lead to condensation in the region upstream of the inlet valves of water disposed in the air. By determining the air humidity of the air upstream of the compressor device (or prior to compression), it is possible to infer the reference or target temperature of the compressed air so that water contained in the air does not condense. That presupposes that the volumes and the pressure conditions and possibly also the actual temperature downstream of the compressor device and downstream of an optional cooler device but upstream of the combustion chamber of the internal combustion engine are known. By means of a regulator (for example when the temperature is known) or a control device (for example when the temperature of the compressed air is estimated or is ascertained only purely by calculation), the actual air temperature can then be set by way of a device for altering the temperature of the compressed air, more specifically in such a way that condensation just does not occur.

The invention is based on the realization that the relative air humidity of the inducted air upstream of the compressor device is a measurement number representative of possible condensation downstream of the compressor device. As the conditions in the engine in the operating state with the same operating conditions are substantially always the same, the most essential parameter is the relative air humidity of the inducted air. That is ascertained in accordance with the invention for example in the intake air conduit or directly in an air filter, but at any event in the region upstream of the compressor device.

In the preferred embodiment, the internal combustion engine and the method of the described kind involve a so-called mixture-boosted internal combustion engine, that is to say an internal combustion engine which is operated with a compressed fuel-air mixture. In that case, not only is the temperature of the compressed air altered depending on (based on) the air humidity of the inducted air, but obviously on the compressed fuel-air mixture. When the description and the claims generally refer to "compressed air", that also embraces a "compressed fuel-air mixture" as that at any event does also contain compressed air. Typically, that involves so-called gas engines which are usually operated on the Otto engine cycle.

In a preferred variant, the internal combustion engine is regulated to a substantially constant operating parameter. In that respect, the operating parameter can be an emission value. In a preferred variant it is then provided that regulation is effected to a constant $NO_x$ concentration.

In a particularly preferred variant it is provided that, with higher air humidity in the inducted air, the temperature of the compressed air to be fed to the combustion chamber is increased, wherein the temperature of the compressed air is not further increased above a maximum humidity value. The reason for this is that the running properties of the engine become markedly worse above a certain temperature of the compressed air or the compressed mixture. As the internal combustion engines according to the invention are used primarily for stationary power generating installations which drive a generator, there are two important regulating concepts. In the so-called network parallel mode of operation where the generator is intended to feed electrical energy into a power mains network, the internal combustion engine is to be operated at a rotary speed which is as constant as possible. In the so-called island mode of operation, the internal combustion engine in turn is to be operated with an output power which is as constant as possible. Particularly in regard to regulation to an output power which is as constant as possible, it is provided in the preferred case that, when a maximum value of relative air humidity in the inducted air is reached, above that maximum humidity value, the output power of the internal combustion engine is also reduced. It is preferably provided in that respect that the output power of the internal combustion engine is effected by adaptation of the boost pressure.

In a further preferred variant it can be provided that the air to be fed to the combustion chamber is compressed jointly with the fuel, preferably fuel gas. Finally it can be provided that regulation to a constant $NO_x$ emission is effected by determining the boost pressure. That regulation is therefore effected by determining the pressure (and the temperature) of the fuel/air mixture immediately upstream of the inlet valves. Finally it can be provided that the maximum humidity value is established depending on (based on) the saturation partial pressure of the water. It is preferably therefore provided that, in addition to regulation of the mixture temperature, the mixture pressure is also adapted by power regulation depending on humidity level. The two regulators provided for that purpose, with a rising level of air humidity, operate in the following sequence: mixture temperature increase and then mixture pressure reduction (power reduction). With air humidity falling again, the mixture pressure is increased to the nominal pressure (nominal power) and the mixture temperature is then reduced in the direction of the nominal temperature.

It has proven to be advantageous for the internal combustion engine if the device for altering the temperature of the compressed air has a cooler device. Additionally or alternatively thereto it can be provided that the device for altering the temperature of the compressed air has a heating device. The cooling device and/or heating device can serve to optimally regulate the temperature of the compressed air before it is fed to the combustion chamber of the internal combustion engine. It is particularly desirable in that respect if the device for altering the temperature has a substantially regulatable cooling device which for example is water-cooled and the temperature of the compressed air is adjusted by way of the water temperature passing into the cooling device.

It is advantageously provided in that respect that the regulating device regulates the internal combustion engine to a substantially constant $NO_x$ emission value. That can be effected for example by the boost pressure being ascertained upstream of the inlet valves.

It is particularly preferably provided that the regulating device is adapted so that with a higher air humidity it increases the temperature of the compressed air by means of the device for altering the temperature of the compressed air. When an upper limit value in respect of the humidity of the inducted air is exceeded, the regulating device holds the temperature at a substantially constant value and reduces the output power of the internal combustion engine. In that respect, the output power of the internal combustion engine can be adapted by adaptation of the boost pressure, preferably by actuation of a throttle flap and/or a blow-by valve.

Besides the above-described method and the above-described internal combustion engine, the invention further concerns a regulating device for carrying out the method and a regulating device for an internal combustion engine of the aforementioned kind. Finally in accordance with the invention there is provided a stationary power generating installation which includes an internal combustion engine of the aforementioned kind and a generator.

BRIEF DESCRIPTION OF THE DRAWING

Further advantages and details of the invention will be apparent from the FIGURE and the specific description hereinafter.

FIG. 1 shows a diagrammatic view of an internal combustion engine according to the invention.

DETAILED DESCRIPTION OF THE INVENTION

FIG. 1 diagrammatically shows an internal combustion engine 1. It has the actual engine block 9 which drives a generator 10 so that the latter produces electrical energy. The induction tract 21 feeds the combustion chambers (not shown) of the engine block 9 with fuel and oxygen-bearing air. In the illustrated embodiment, a fuel/air mixture is produced by way of an air feed 18 and a fuel gas feed 19 by way of which for example methane is supplied, in a gas mixer 17. The gas mixer feeds the gas (air and fuel gas) into the compressor device 2 driven by way of a shaft 23 by way of an exhaust gas turbocharger 4 (in the exhaust gas tract 22). The gas which is now compressed is cooled in the regulatable mixture cooler 3 for altering the temperature of the compressed air (here: compressed fuel-air mixture) and is then passed by way of a throttle device 5 (here in the form of a throttle flap) to the inlet valves by way of the inlet duct 13 into the combustion chambers of the multi-cylinder internal combustion engine. A regulatable, preferably water-cooled cooling device 3 can alter the temperature of the air by altering the temperature of the cooling water passed into the cooling device 3. Typically such a change in the cooling water temperature is effected by varying the feed flow of cooler or hotter water.

According to the invention provided in the air induction conduit 18 there is now a humidity sensor 8 ascertaining the relative air humidity of the induction air. At the same time, in the illustrated embodiment, the temperature of the induction air is ascertained with a temperature measuring device, for example a thermometer. The apparatus 3 for altering the temperature of the compressed air is regulated depending on the electrical power p or the electrical equivalent e of the generator 10 by way of a regulating device 11 connected to the sensor 8. At the same time, the internal combustion engine is re-regulated by way of other control members 23 and a further regulating device 12 which serve for $NO_x$ adaptation and for power adaptation. Further control members 23 are for example the ignition timing and the mixture λ (ratio of fuel to oxygen in the air) which is altered for example by way of the gas mixer 17. The two regulating devices 11 and 12 communicate with each other by way of the data line 24, but in theory it is also possible to provide a single regulating device.

A further possible way of improving regulation of the internal combustion engine 1 involves ascertaining additional parameters. For example by way of sensors 15, 16 which are arranged in the exhaust gas tract 22 or the exhaust gas conduit 14 and which ascertain the exhaust gas temperature upstream or downstream of the turbocharger 4 respectively. With excessively high compression for example the power at the compressor device 2 could be reduced by way of a turbine bypass 7 (referred to as a waste gate). In a similar fashion compressed gas can be fed back upstream of the compressor by way of a blow-by valve or a so-called turbobypass 6. In particular, the temperature of the compressed air (the fuel-air mixture) is also used prior to entry into the combustion chamber as a regulating parameter as the temperature upstream of the combustion chamber is a measurement in respect of condensation (depending on pressure). For that purpose, the temperature measuring device 20 (for example a thermometer) is provided, which is in communication with the regulating device 11.

Calculation of absolute humidity (kilogram of water per kilogram of dry air) is ascertained by means of the relative humidity in percent, the induction temperature in degrees Celsius and the air pressure in millibars. Finally, a possible regulating concept will now be described hereinafter.

The absolute moisture level [kg of water/kg of dry air] is ascertained by means of the ascertained relative moisture level [%], the induction temperature [° C.] and the air pressure [mbar]. The air pressure $P_{baro}$ is ascertained by means of a boost pressure sensor. The measurement value is continuously adopted, only when the engine is stationary and as long as the engine is not under demand. To calculate the individual parameters attention is directed to the collection of formulae set out hereinafter.

To regulate the engine to a constant $NO_x$ emission, an offset is added by means of two support locations to the regulating straight line ("Leanox straight line": regulation is effected in accordance with EP 0 259 382 B1, to the disclosure of which reference is made) in respect of engine power. The support locations are disposed on the one hand at the activation power of knocking regulation and on the other hand at engine full load. With increasing air humidity, the boost pressure is reduced with the power remaining the same. When the points for the regulating straight line are stored the current moisture content is taken into consideration. The moisture compensation component is automatically deducted from the boost pressures (SAVE 1 and SAVE 2).

To avoid condensation downstream of the mixture cooler, the maximum permitted boost pressure is calculated on the basis of the current moisture level and the current mixture temperature. That pressure limits the engine power by means of a specific power reduction.

The action of the maximum permitted boost pressure on the power reduction can be reduced and thus delayed by means of an offset value.

Calculation of the t2' Humidity (See the FIGURE) Upstream of the Inlet Valves:

Besides boost pressure regulation a rise in the mixture temperature can also contribute to avoiding condensation. It is possible to specify by means of parameters, the value by which the temperature may be raised. Calculation of that temperature is set out under the heading of the collection of formulae.

Condensation Avoidance Regulation:

With a Rising Absolute Moisture Level the Following Steps are Performed:

Increase in the mixture temperature: if the moisture level rises more, water can be absorbed in the mixture by virtue of a higher mixture temperature. Condensation is thus less. If mixture temperature regulation should be possible, an offset can be added by means of enablement parameters. The mixture temperature is then increased until the maximum permitted temperature (parameter value) is reached. The specified temperature is to be related to the reference or target value specified in relation to the mixture temperature regulator. If the actual mixture temperature should not be approximated in an adjustable time to a deviation of 2° C. power reduction is also activated. So that the difference between the two temperatures can be adapted there is a specific parameter for that purpose.

Power Reduction:

If the mixture temperature increase is not possible or is deactivated, the power reduction comes into effect. Power reduction can be switched on/off by way of a parameter and reduces the power in accordance with the maximum admissible boost pressure down to a minimum power (parameter value). The degree of the influence of moisture can be influenced by means of an offset (parameter value) in a downward direction.

In the Case of Falling Absolute Moisture Level the Following Steps are Performed:

Power increase (if the power is increased again until the nominal power has been reached), mixture temperature reduction (if the absolute moisture level falls further then the mixture temperature is lowered again until the offset in relation to the reference value is again equal to zero).

Collection of Formulae:

Calculation of the absolute moisture level [kg of water/kg of dry air] from relative moisture level [%], induction temperature [° C.] and air pressure [mbar]:

1. Measurement of air pressure $P_{baro}$ by means of the boost pressure sensor. The measurement value is continuously recorded only when the engine is stationary and as long as the engine is not under demand.

2. Calculation of saturation vapor pressure $P_s$ at the induction temperature with the Antoine equation:

$$P_s = 10^{(8.0732991-(\frac{1656.39}{226.86+T}))}$$

$P_s$ is the saturation partial pressure of water in air in [mbar]
T is the induction temperature in [° C.]

3. Calculation of the absolute moisture with Dalton's formula:

$$x_w = 0.622 \cdot \frac{P_s}{\frac{P_{baro}}{\varphi} - P_s}$$

$x_w$ is the water content in [kg of water/kg of dry air]
$P_{baro}$ is the air pressure in [mbar]
$\varphi$ is the air humidity in [%/100]
$NO_x$ compensation:

$$\text{Offset\_Leanox} = \frac{\text{Compensation value\_}P_N \cdot 1000}{\text{moisture}_{absolute}}$$

$$\text{Offset\_Leanox} = \frac{\text{Compensation value\_}P_{knocking\_act} \cdot 1000}{\text{moisture}_{absolute}}$$

Offset_Leanox is the boost pressure offset by moisture compensation in [mbar]

Compensation value_$P_{knocking\_act}$ is compensation at knocking regulator activation power [mbar]

Compensation value_$P_N$ is compensation at engine nominal power in [mbar]

Moisture$_{absolute}$ is the moisture absolute in [kg/kg]

Taking account of the moisture upon storage of the LEANOX points:

For example storage of the Leanox straight line at engine half-load and with an absolute moisture of X[kg/kg]

LEANOX_*P*1_boost pressure=*P*2'+
  *X*\*1000\*compensation value$_{power\_P1}$

LEANOX_*P*2_boost pressure=*P*2'+
  *X*\*1000\*compensation value$_{power\_P2}$

LEANOX_P1_boost pressure is the stored boost pressure at LEANOX SAVE 1 [mbar]

LEANOX_P2_boost pressure is the stored boost pressure at LEANOX SAVE 1 [mbar]

P2' is the boost pressure in [mbar]

X is the moisture in [kg/kg]

Compensation value$_{power\_P1}$ is the compensation at LEANOX SAVE 1 power [mbar]

Compensation value$_{power\_P2}$ is the compensation at LEANOX SAVE 2 power [mbar]

Calculation of maximum boost pressure in accordance with formulae 1 and 2. Condensation is tolerated at that boost pressure.

Formula 1: Calculation of the Moisture Less the Adjustable Offset $$\text{Moisture\_abs\_offset} = \text{moisture}_{absolute} * \text{percent}_{offset}$$

Moisture+abs_offset is moisture absolute with offset reduced in [kg/kg]

Moisture$_{absolute}$ is moisture absolute in [g/kg]

Percent$_{offset}$ is the percentage value (for example 90% for 10% reduction) in [%]

Formula 2: Calculation of the Maximum Permitted Boost Pressure $$\text{Boost pressure}_{maximum} = \frac{0.622 \cdot P_{s\_t2}}{\text{moisture\_abs\_offset}} + P_{s\_t2}$$

Boost pressure$_{maximum}$ is the maximum permitted boost pressure in [N/m$^2$]

$P_{s\_t2}$ is the P saturation at the mixture temperature in [N/m$^2$]

Moisture_abs_offset is moisture absolute with offset reduced in [kg/kg]

The permitted boost pressure is limited by scaling of the boost pressure sensor (for example 0-6.5 bars). The maximum permitted boost pressure is averaged over 10 seconds. The individual maximum boost pressures are for that purpose stored in a memory every 100 ms.

The same averaging is also used for the currently prevailing boost pressure.

Calculation t2' Humidity:

Formula 1: Calculation of Saturation Partial Pressure at Current Boost Pressure and with Moisture Offset:

$$P_{s\_LFO} = \frac{P2' \cdot \text{moisture\_abs\_offset}}{0.622 + \text{moisture\_abs\_offset}}$$

$P_{s\_LFO}$ is the saturation partial pressure–boost pressure moisture offset [mbar]

P2' is boost pressure in [mbar]

Moisture_abs_offset is moisture absolute with offset reduced in [kg/kg]

Formula 2: Calculation of the Minimum Mixture Temperature in Dependence on $P_{S\_LFO}$:

$$t2'_{moisture} = \frac{-1656.39}{\log(P_{S\_LFO}) - 8.0732991} - 226.86$$

t2'$_{moisture}$ is the minimum mixture temperature humidity [° C.]

$P_{S\_LFO}$ is the saturation partial pressure–boost pressure moisture offset in [mbar]

The invention claimed is:

1. A method of operating an internal combustion engine, comprising:

inducting air into an induction tract and determining an air humidity of the inducted air before compression of the inducted air;

mixing the inducted air with fuel to obtain an air-and-fuel mixture;

compressing the air-and-fuel mixture before feeding the air-and-fuel mixture to a combustion chamber of the internal combustion engine; and controlling a temperature of the compressed air-and-fuel mixture based on the air humidity of the inducted air.

2. The method of claim 1, wherein said controlling of the temperature of the compressed air-and-fuel mixture fed to the combustion chamber comprises adjusting the temperature so that the internal combustion engine is regulated to a substantially constant operating parameter.

3. The method of claim 2, wherein the operating parameter is an emission value.

4. The method of claim 3, wherein said adjusting is effected to achieve a constant NOx concentration.

5. The method of claim 1, wherein said controlling comprises increasing the temperature of the compressed air-and-fuel mixture to be fed to the combustion chamber when an air humidity in the inducted air increases, wherein the temperature of the compressed air-and-fuel is not further increased when a predeterminable, maximum air humidity value has been reached.

6. The method of claim 5, further comprising reducing an output power of the internal combustion engine when the maximum humidity value of the inducted air is exceeded.

7. The method of claim 6, wherein the output power of the internal combustion engine is effected by adaptation of a boost pressure.

8. The method of claim 5, further comprising setting the maximum air humidity value based on a saturation partial pressure of water in the inducted air.

9. The method of claim 1, wherein said controlling of the temperature of the compressed air-and-fuel mixture fed to the combustion chamber comprises achieving a constant NOx emission by determining a boost pressure.

10. An internal combustion engine comprising:

a humidity sensor for measuring air humidity of air inducted into an induction tract of the internal combustion engine, said humidity sensor being located so as to measure the air humidity before compression of the inducted air;

a gas mixing device for mixing fuel and the inducted air to form an air-and-fuel mixture;

a compressor device downstream of said gas mixing device for compressing the air-and-fuel mixture;

a temperature-adjusting device for altering a temperature of the compressed air-and-fuel mixture; and a control device for regulating the internal combustion engine to a substantially constant operating parameter by controlling said temperature-adjusting device based on the air humidity of the inducted air as measured by said humidity sensor.

11. The internal combustion engine of claim 10, wherein said temperature-adjusting device includes a cooling device.

12. The internal combustion engine of claim 11, wherein said temperature-adjusting device further includes a heating device.

13. The internal combustion engine of claim 10, wherein said temperature-adjusting device further includes a heating device.

14. The internal combustion engine of claim 10, wherein said control device regulates the internal combustion engine to achieve a substantially constant NOx emission value.

15. The internal combustion engine of claim 10, wherein said control device regulates the internal combustion engine to achieve a substantially constant output power.

16. The internal combustion engine of claim 10, wherein said control device is configured such that, at a higher air humidity level, said control device controls said temperature-adjusting device to increase the temperature of the compressed air-and-fuel mixture, and such that, when an upper limit value of the air humidity is exceeded, said control device holds the temperature at a substantially constant value and reduces output power of the internal combustion engine.

17. The internal combustion engine of claim 16, wherein the output power of the internal combustion engine is adapted by adaptation of a boost pressure.

18. An arrangement comprising:
   a stationary power generating installation including a generator; and
   an internal combustion engine comprising:
      a humidity sensor for measuring air humidity of air inducted into an induction tract of the internal combustion engine, said humidity sensor being located so as to measure the air humidity before compression of the inducted air;
      a gas mixing device for mixing fuel and the inducted air to form an air-and-fuel mixture;
      a compressor device downstream of said gas mixing device for compressing the air-and-fuel mixture;
      a temperature-adjusting device for altering a temperature of the compressed air-and-fuel mixture; and
      a control device for regulating the internal combustion engine to a substantially constant operating parameter by controlling said temperature-adjusting device based on the air humidity of the inducted air as measured by said humidity sensor.

19. The arrangement of claim 18, wherein said temperature-adjusting device includes a cooling device.

20. The arrangement of claim 18, wherein said temperature-adjusting device further includes a heating device.

* * * * *